INVENTOR
JOHN D. ADAIR

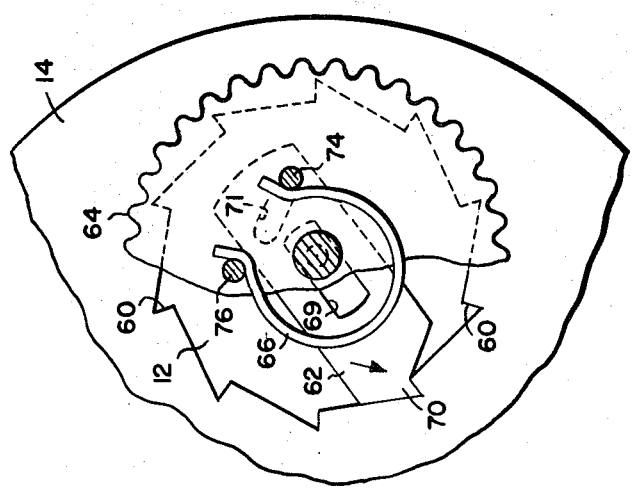
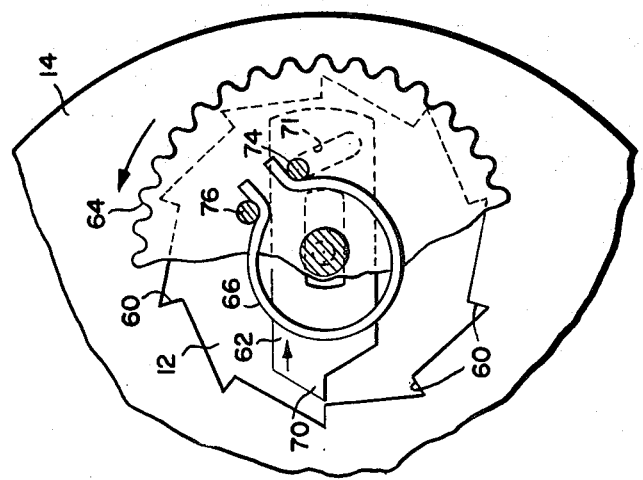
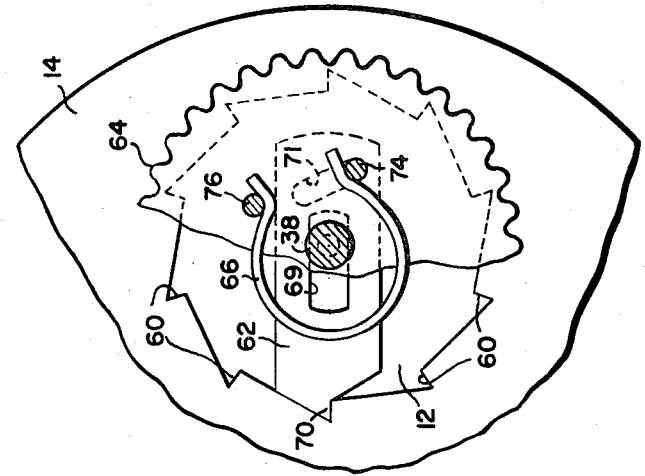

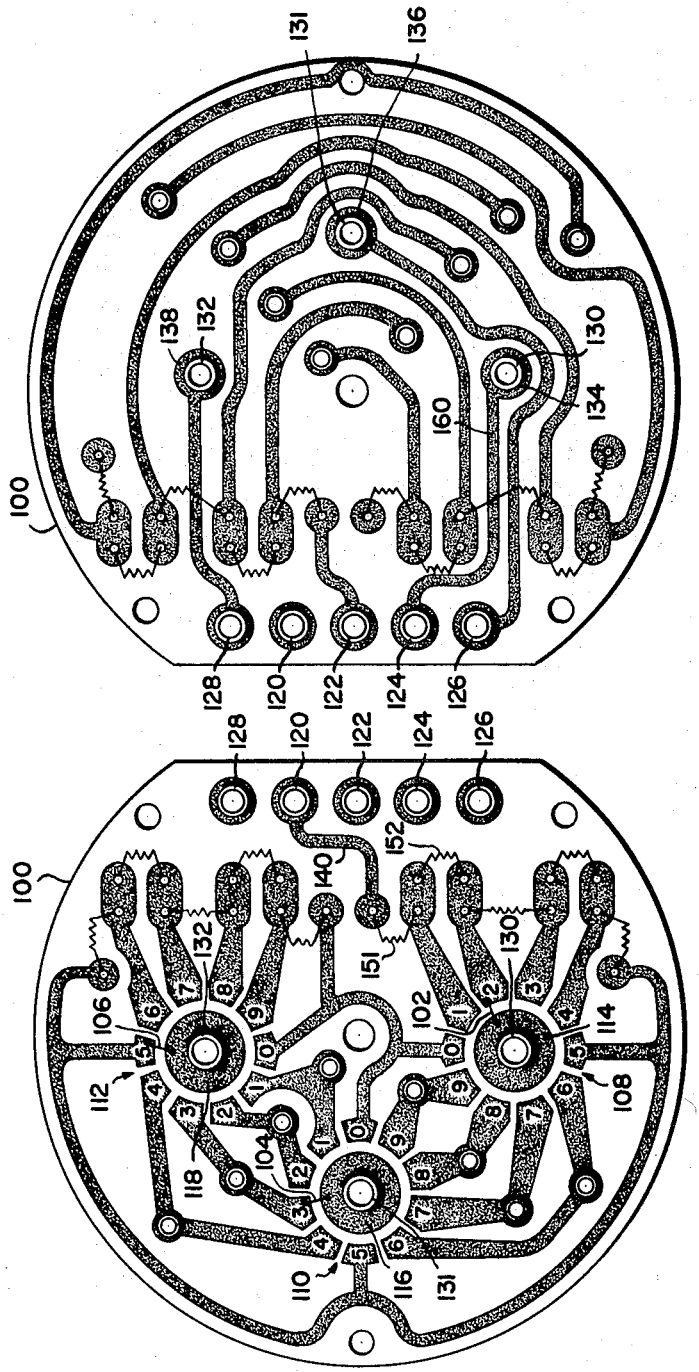

United States Patent Office 3,537,005
Patented Oct. 27, 1970

1

3,537,005
METERING APPARATUS WITH DIGITAL
ELECTRICAL READOUT
John D. Adair, Huntingdon Valley, Pa., assignor to American Meter Company, Philadelphia, Pa., a corporation of Delaware
Filed Aug. 25, 1967, Ser. No. 663,350
Int. Cl. G01r 11/16
U.S. Cl. 324—153      7 Claims

ABSTRACT OF THE DISCLOSURE

A meter construction in which the movement of an element in accordance with the quantity of the condition being metered is transmitted to digital registering devices in a manner so that the registering devices will always provide a whole digit reading.

BACKGROUND OF THE INVENTION

The invention relates to a mechanism for use in meter registers of the type used in water meters, gas meters and other utility meters. The mechanism is particularly adapted for use with meters of the indicated type adapted for remote reading. In one form of these remote reading systems, a meter reader carries a small box containing a battery and one or more electrical meters. The box is provided with a connector which can be coupled with a plug or socket available from the exterior of the building and connected to the meter within the building to effect a readout of the meter registering mechanism. Another form of remote reading system involves means to permit automatic reading at a central recording station.

Meter registering devices are well known, Pat. No. 3,069,670 being illustrative of a remote reading system for such meters.

One of the problems with devices of the indicated type is that errors in reading can be made when the indicating registers are positioned between whole digits. It is an object of the invention to overcome this problem of the prior art devices.

SUMMARY OF THE INVENTION

Briefly stated, in accordance with the invention the problem of errors in the reading of fractional digits is overcome by the provision of a novel means for transmitting the movement of the element of the meter which is moved in accordance with the condition being metered to the low order registering shaft of the meter. The meter is provided with a plurality of digital indicator shafts, one for each order of digits to be registered by the meter, and a circuit means associated with each shaft for indicating the registering position thereof, each circuit means including a plurality of circumferentially spaced contact segments and a contact wiper rotatable with each shaft and movable across the segments for making different circuit connections in accordance with the shaft positions. The means for transmitting the movement of the condition responsive element to the low order digital indicator shaft includes a shaft member cooperable with the element for movement in relation thereto and means interconnecting the shaft member with the low order indicator shaft for moving the same successively through a stepping movement only after a predetermined amount of rotation of the shaft member. In accordance with the construction of the invention the stepping movement of the low indicator shaft causes rotation of the contact wiper from one of the contact segments to another so that the contact wiper will at all times be in contact with one of said segments to thereby indicate a whole digit.

2

BRIEF DESCRIPTION OF THE DRAWINGS

FIGS. 2A, 2B and 2C are views illustrating the sequence of operation of the drive means for the low order digital indicator shaft of the meter shown in FIG. 1;

FIGS. 4 and 5 are views illustrating a detail of the construction in accordance with the invention.

Figure 1:
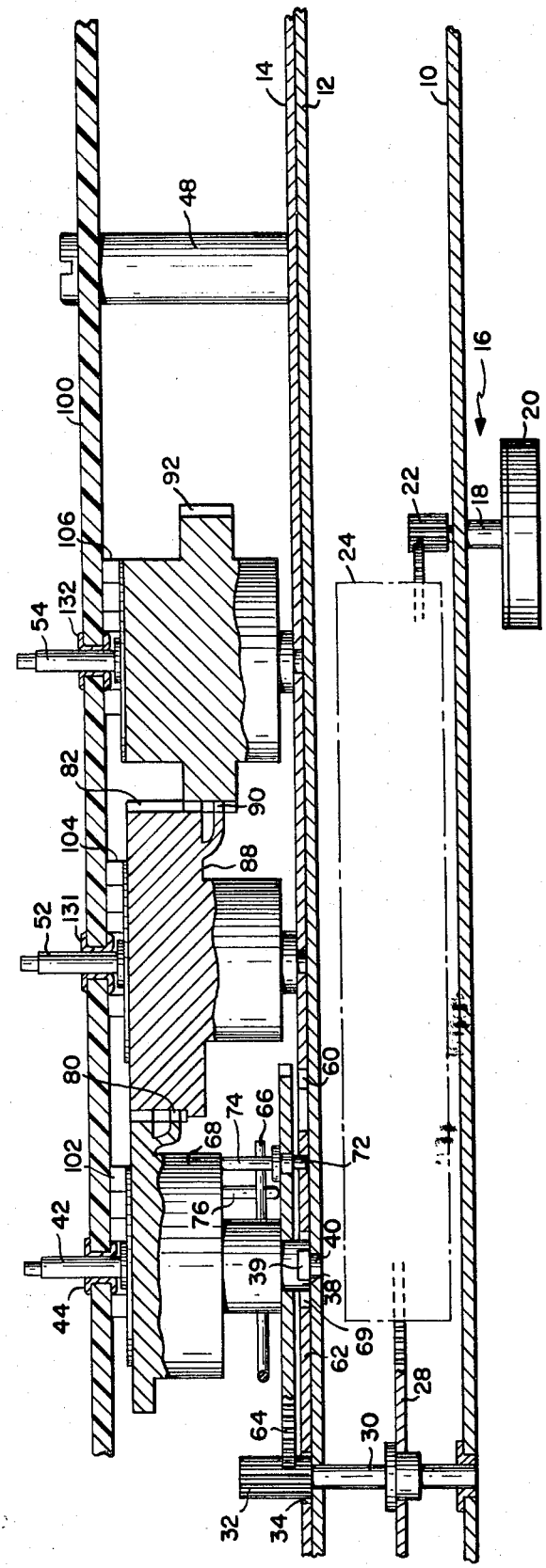
FIG. 1 is a fragmentary sectional view of a portion of a meter embodying the construction in accordance with the invention.

DESCRIPTION OF THE PREFERRED
EMBODIMENT

The meter construction shown in the drawings is adapted for use in a water meter and the description herein will relate to the application of the invention to a water meter. It will be apparent, however, that the invention has more general application and the construction can be employed in meters of various types.

In FIG. 1, the portion of the meter housing embodying the invention is illustrated in section. The meter comprises a plurality of supporting plates 10, 12 and 14 for the various elements of the meter. The water meter element which is driven by the flow responsive means within the meter is indicated generally at 16 and comprises a spindle 18 rotatably mounted in plate 10 and carrying a magnet 20 at its lower end. The magnet 20 is magnetically coupled to a drive magnet (not shown) which is rotated in response of the flow of water through the meter.

The spindle 18 carries a gear 22 at its upper end. The gear 22 serves as the input gear of the usual reduction gearing, indicated schematically at 24. A gear 28 is arranged at the output end of the reduction gearing 24 and is coupled onto a shaft 30 for driving the same. The shaft 30 extends vertically, as viewed in FIG. 1 and is journalled in support plates 10 and 12 as is best shown in FIG. 1. At its upper end, the shaft 30 is provided with a small gear 32 which extends through opening 34 in plate 14.

Journalled in an opening in support plate 12 is lower end 40 of the low order digital indicator shaft 42 of the meter. The upper end of shaft 42 is journalled in an eyelet 44 in a printed circuit board 100 mounted on the supporting plate 14 by means of a plurality of pins 48. The meter is also provided with higher order digital indicator shafts 52 and 54. The shafts 42, 52 and 54 carry pointers (not shown) at their upper ends cooperating with dials in order to indicate, respectively, for example, tens, hundreds, and thousands of gallons of water flowing through the meter. The drive interconnections between the digital indicator shafts will be described hereafter.

It will be noted that the projection 40 and the shoulder formed by the lower end of a hub 38 formed on shaft 42 serve as a bearing for supporting the lower end of digital indicator shaft 42 for rotation about its axis, the shaft 42 being mounted at its ends for free rotation about its axis and for free rotation relative to shaft 30.

Means are provided in accordance with the invention for interconnecting the shaft 30 with the low order indicator shaft 42 for moving the latter successively through a stepping movement only after a predetermined amount of rotation of the shaft 30. Such means comprises, specifically, the gear 32, means providing a plurality of ratchet teeth 60 extending circumferentially around hub 38 on shaft 42, a stepping link 62 having a tooth engageable with the ratchet teeth 60, a pin gear 64 mounted for rotation on hub 38, a wire spring 66 and a wheel 68 formed on the indicator shaft 42.

The ratchet teeth 60 are provided by a cutout in plate 14 and extend concentrically around shaft 42 in alignment with the lower portion of hub 38. There are provided ten ratchet teeth 60, each tooth having a portion extending radially relative to the axis of shaft 42 as is best shown in FIGS. 2A to 2C. The stepping link 62 is mounted within the cutout defining the ratchet teeth 60 and rests on the top of supporting plate 12. The stepping link 62 has an elongated central slot 69 into which hub 38 extends. The slot 69 has a pair of spaced apart straight sides which cooperate with conforming parallel wall portions 39 formed on the hub 38. By this arrangement, the slot 69 guides the stepping link 62 for movement radially relative to hub 38, by reason of the cooperation between the straight sides of the slot 69 and the parallel wall portions 39. This arrangement also provides for conjoint rotation of the stepping link 62 and the low order indicator shaft 42.

The stepping link 62 has a single tooth 70 formed at one end and constructed and arranged to engage the ratchet teeth 60. On the end of the stepping link 62 opposite to the tooth 70 there is provided a cam slot 71. As is best shown in FIGS. 2A to 2C, the cam slot 71 extends at an angle to the stepping tooth's longitudinal axis extending through the center of slot 69. A pin 72, which is carried by pin gear 64, extends downwardly into the cam slot 71 for engagement therein.

The wire spring 66 is mounted with one end in contact with a pin 74 carried by and projecting upwardly from pin gear 64 and has its other end in contact with a pin 76 carried by and projecting downwardly from the upper wheel 68 of indicator shaft 42. By this arrangement, the spring 66 acts between pins 74 and 76 to bias the indicator shaft 42 in a counter-clockwise direction as viewed in FIGS. 2A to 2C. It will be noted that the pin gear 64 is held against rotation by reason of its engagement with gear 32 while the shaft 42 is freely rotatable except that it is held against rotation by reason of the engagement of the tooth 70 of the stepping link 62 with one of the ratchet teeth 60.

The manner in which the rotation of the shaft 30 is transmitted to the indicator shaft 42 will be described with particular reference to FIGS. 2A to 2C. In FIG. 2A the parts are shown in the position immediately after a stepping movement has occurred with the indicator shaft 42 being in a position to indicate one of the ten digits between "0" and "9," representing tens of gallons of water. As water continues to flow through the meter, the element 16 is rotated and the movement thereof is transmitted through gear 22, reduction gear 24, and gear 28 to the shaft 30. The shaft 30 is thus rotated an amount corresponding to the amount of flow through the meter. The parts are constructed and arranged so that pin gear 64 is rotated on a counter-clockwise direction by shaft 30, the pin gear 64 rotating about the round upper portion of hub 38. However, it will be apparent that the stepping link 62 will be held against rotation by reason of the engagement of tooth 70 with one of the ratchet teeth 60.

The shaft 30 will rotate the pin gear 64 in a counter-clockwise direction to the position shown in FIG. 2B in response to the rotation of element 16 in accordance with the flow of ten gallons of water through the meter. As the pin gear 64 is moved from the FIG. 2A position to the FIG. 2B position, the pin 72 operating in the cam slot 71 serves to cam the stepping link 62 to the right whereby the tooth 70 is moved to the position shown in FIG. 3 in which it is just out of engagement with the cooperating ratchet tooth 60. During this movement, the spring 66 continues to bias the stepping link 62, by reason of its engagement with shaft 42 through pin 76, toward counter-clockwise movement but the engagement between the teeth 60 and 70 prevents such movement until the tooth 70 moves out of engagement with the cooperating tooth 60.

When the parts are moved to the position shown in FIG. 2B, the stepping link 62 is no longer held against rotation and, in accordance with the bias of spring 66, is moved rapidly with a snap action to the position shown in FIG. 2C. Thus, the stepping link 62 is moved in a counter-clockwise direction along the ratchet teeth 60 to the next tooth. This movement is guided by the engagement of the pin 72 in the cam slot 71 whereby the stepping link 62 is moved to the left and counter-clockwise to position shown in FIG. 2C.

The counter-clockwise movement of the stepping link 62 from the FIG. 2B position to the FIG. 2C position is transmitted to the indicator shaft 42 by reason of the engagement therebetween at slot 69 and wall portions 39. Accordingly, the digital indicator shaft 42 is stepped to the next digital indicating position. Since there are ten ratchet teeth, the shaft 42 will be stepped one-tenth of a revolution. The shaft 42 will, of course, be stepped through ten indicating positions in accordance with the movement of the stepping link 62 along the ten ratchet teeth 60. It will be noted that the indicator shaft 42 will always be in one of its ten indicating positions except during the instantaneous stepping movement, wherefore, for practical purposes, the indicator shaft 42 will always be in a position to indicate a whole digit.

Means are provided for driving the hundreds indicator shaft 52 in a ratio of 1 to 10 from the tens indicator shaft 42. Such means comprises a transfer tooth 80 formed on the wheel 68 and arranged to engage the teeth on a gear 82 formed on the shaft 52 for driving the same. The cooperation between the tooth 80 and the gear 82 is in the nature of a Geneva drive, the parts being constructed so that for each revolution of the drive wheel 68, the gear 82 will be advanced one-tenth of a revolution, thus achieving the 1 to 10 ratio between the shafts 42 and 52. The parts are arranged so that when the tens indicator shaft 42 moves from the "9" digit to the "0" digit, the hundreds indicator shaft 52 is advanced one digit.

Means are provided for driving the thousands indicator shaft 54 in a ratio of 1 to 10 from the hundreds indicator shaft 52. This means is similar to the drive between shafts 42 and 52 and comprises a drive wheel 88 formed on the shaft 52 for rotation therewith. A transfer tooth 90 is formed on the drive wheel 88 and is arranged for engagement with the teeth of a gear 92 formed on the shaft 54 for driving the same. For each rotation of the drive wheel 88 and shaft 52 the tooth 90 engages the gear 92 to drive the gear 92 and shaft 54 one-tenth of a revolution. The parts are arranged so that when the hundreds indicator shaft 52 moves from the "9" digit to the "0" digit, the thousands indicator shaft 54 is advanced one digit.

While the digital indicator shafts are provided with the usual pointers and dials for the visual reading of the meter at its location within the house, the form of the meter disclosed herein is also provided with means for providing an electrical reading of the digital indicating positions of the indicator shafts so that the meter can be read at a remote location such as at the exterior of the building by a remote reading device. Various circuit means for this purpose and remote reading systems are well known, such as that disclosed in Pat. No. 3,069,670. The circuit means disclosed herein is similar to that disclosed in said patent and is provided with a printed circuit board 100 best illustrated in FIGS. 6 and 7, and a contact wiper associated with each of the indicator shafts. The circuit board 100 is made of electrical insulating material with conductor portions on the top and bottom surfaces. The contact wipers 102, 104 and 106 are mounted on the shafts 42, 52 and 54, respectively, for rotation therewith.

Referring now to FIGS. 4 and 5, respectively, showing the bottom and top of the circuit board 100, the bottom of the circuit board 100 is provided with three sets of segments 108, 110 and 112 arranged concentrically and circumferentially spaced around the upper portion of indicator shafts 42, 52 and 54, respectively. There are ten segments in each of the sets corresponding to the digits from "0" to "9" as indicated in FIGS. 4 and 5. Arranged concentrically within each of the sets of segments 108, 110, and 112 are annular contact portions 114, 116 and 118, respectively. The contact wipers 102, 104 and 106 are constructed to sweep around the various segments 108, 110 and 112, respectively, in response to movement of the indicator shafts and to provide a circuit connection between one of the segments and the annular contact portion associated therewith. Each of the contact wipers is in the form of a thin metallic disc having strips cut out therefrom and bent upwardly, there being two inner strips for contact with the annular contact portions 114, 116 and 118 and one outer strip for contact with the various segments 108, 110 and 112.

The circuit board 100 is provided with a pair of terminals 120 and 122 to which the battery of the readout device is connected during the remote reading of the meter. There are also provided three terminals 124, 126 and 128 connected to the reading circuits of the readout device during the reading of the meter. The terminals 124, 126 and 128 are respectively connected to the tens, hundreds, and thousands indicator shaft segments 108, 110 and 112 by the contact wipers 102, 104 and 106 as will become apparent.

Figure 3:
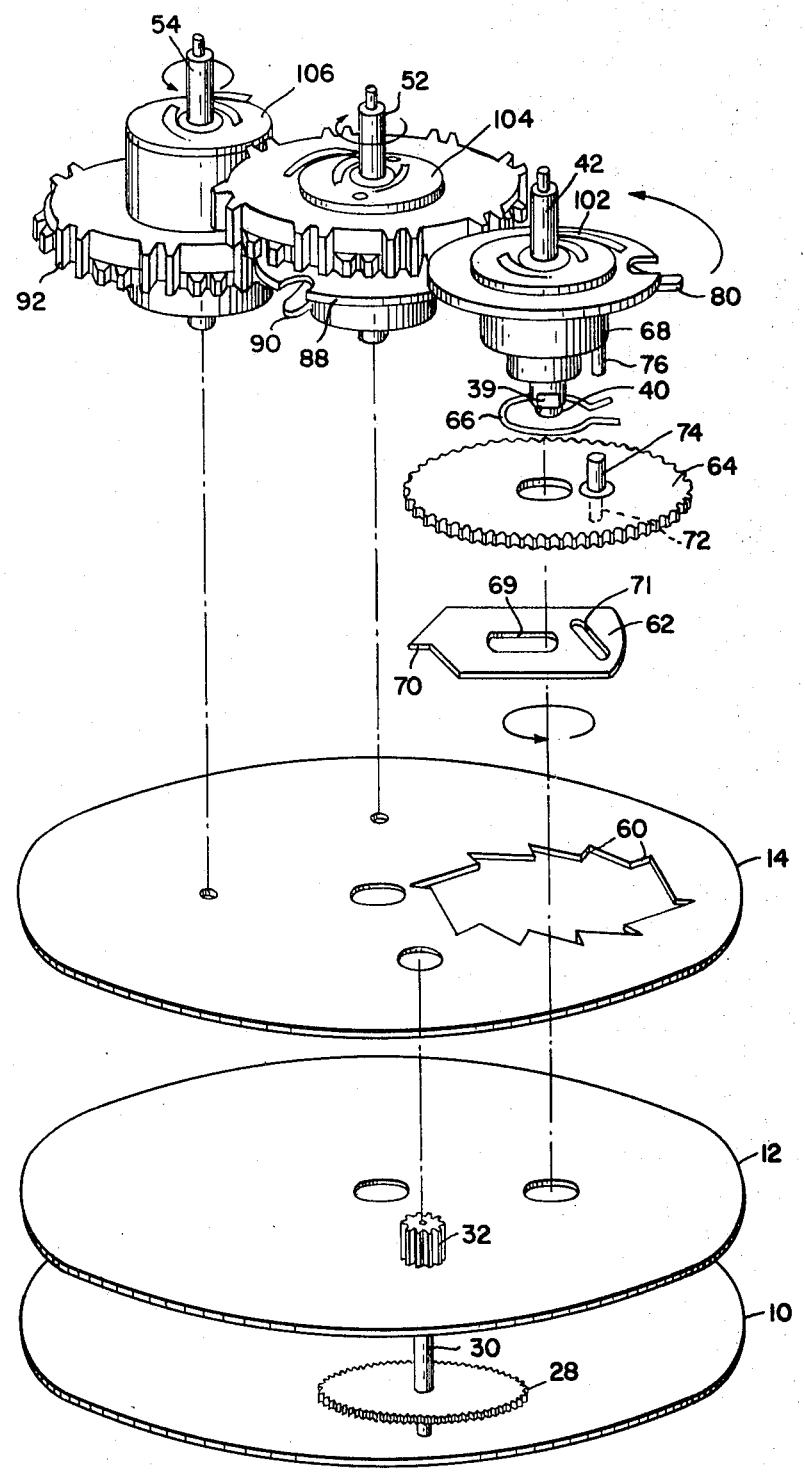
FIG. 3 is an exploded view of the drive means shown in FIGS. 2A, 2B and 2C.

The printed circuit conductor portions on the bottom of the board 100 are electrically interconnected with the printed circuit conductor portions on the top of the board by means of eyelets extending through the printed circuit board between the top and bottom thereof. The eyelets 130, 131 and 132 for interconnecting the annular contact portions 114, 116 and 118 with the circular conductor portions 134, 136 and 138 on the top of the board 100 are shown in FIG. 1 in section and these eyelets also serve as the journal bearings for the tops of the indicator shafts 42, 52 and 54 as was described previously. The other eyelets are shown in FIGS. 3 and 4 and serve to interconnect the various printed circuit conductor portions on the top and bottom of the board in the manner indicated in these figures.

As can be seen by tracing the circuit portions on the printed circuit board 100, the segments for each digit of a set 108, 110 and 112 are connected in parallel to one another and there are resistors between the adjacent parallel segments. The resistors are thus connected in series between the supply terminals 120 and 122 and the three terminals 124, 126 and 128. Thus, the circuit from one of the supply terminals to one of the three terminals 124, 126 and 128 passes through a predetermined number of resistors and thus has a known resistance. This resistance arrangement is used to permit a comparison of resistances by the remote reading device as is discussed in detail in said Pat. No. 3,069,670. Accordingly, the circuitry provided by the printed circuit board gives an indication of which digit is being indicated by a digital indicator shaft. It will be obvious, of course, that various circuit means may be employed to achieve this result.

To illustrate the manner in which the circuitry is connected to give an indication of the position of the digital indicator shafts 42, 52 and 54, let it be assumed that the shafts are positioned to indicate the No. 2 digit of the tens indicator shaft 42, the No. 3 digit of the hundreds indicator shaft 52 and the No. 5 digit of the thousands indicator shaft 54. In this case, the contact wipers 102, 104 and 106 are positioned as indicated in FIG. 3 to provide interconnection between the appropriate segment and the central annular contact portion 114, 116 and 118 associated therewith. Accordingly, the circuit for the tens digital indicator shaft 42 is from the supply terminal 120, through a conductor 140 and the two resistors 151 and 152 to the No. 2 segment of the tens segmental set 108, through the contact wiper 102 to annular contact portion 114, through the eyelet 130, to the circular conductor 134 on the top of the circuit board 100 and through a conductor 160 to the terminal 124 for the tens digital indicator. The circuitry for the No. 3 digit of the hundreds indicator shaft 52 can be traced by consideration of the printed circuit board 100, it being noted that the circuitry is connected between the supply terminal 122 and the tens terminal 126. The circuit for the No. 5 digit of the thousands indicator shaft 54 can also be traced by consideration of the circuitry of the printed circuit board 100 and is connected between the positive supply terminal 120 and the thousands terminal 128.

It will be apparent that by reason of the stepping-type drive described above, the contact wipers 102, 104 and 106 will at all times be in contact with one of the indicator segments 108, 110 and 112. This is true of all three wipers. Accordingly, whenever a remote reading is taken by a meter reader, the circuit means for the meter will at all times be in position to indicate whole digits.

It will be apparent that various changes may be made in the construction and arrangement of parts without departing from the scope of the invention. Accordingly, it is not desired to be limited except as required by the following claims.

I claim:

1. In a meter having an element movable in response to the condition to be metered, the combination comprising a plurality of digital indicator shafts, one for each order of digits to be registered by the meter, a circuit means associated with each shaft for indicating the registering position thereof, each circuit means including a plurality of circumferentially spaced contact segments and a contact wiper rotatable with each shaft and movable across said segments for making different circuit connections in accordance with the shaft positions, means for transmitting movement of said condition responsive element to the low order digital indicator shaft, including a shaft member cooperable with said condition responsive element for movement in relation therewith, and means interconnecting said shaft member with said low order indicator shaft for moving the same successively through a stepping movement only after a predetermined amount of rotation of said shaft member, said stepping movement of said low order indicator shaft causing rotation of said contact wiper from one of said spaced contact segments to another whereby said contact wiper will be in contact with one of said segments at all times except during said stepping movement, said interconnecting means including means providing a plurality of stationary ratchet teeth extending circumferentially around the axis of said indicator shaft, a link having a tooth engageable with said ratchet teeth, means mounting said link on said low order indicator shaft for rotation with said indicator shaft and for radial movement with respect to said indicator shaft whereby said tooth can become engaged with and disengaged from said ratchet teeth, camming means driven by said shaft member, a follower in said link cooperating with said camming means to effect a radial movement of said tooth when said shaft member is rotated to disengage said tooth from said ratchet teeth, and a spring connected between said shaft member and said indicator shaft for storing energy to rotate said link and indicator shaft when said tooth becomes disengaged from a ratchet tooth, said camming means and follower effecting can opposite radial movement of said tooth as said indicator shaft rotates to cause said tooth to engage a next ratchet tooth.

2. In a meter having an element movable in response to the condition to be metered, the combination comprising a plurality of digital indicator shafts, one for each order of digits to be registered by the meter, a circuit means associated with each shaft for indicating the registering position thereof, each circuit means including a plurality of circumferentially spaced contact segments and a contact wiper rotatable with each shaft and movable across said segments for making different circuit connections in accordance with the shaft positions, means for transmitting movement of said condition responsive element to the low order digital indicator shaft, including a shaft member cooperable with said condition responsive element for movement in relation therewith, and means interconnecting said shaft member with said low order indicator shaft for moving the same successively through a stepping movement only after a predetermined amount of rotation of said shaft member, said stepping movement of said low order indicator shaft causing rotation of said contact wiper from one of said spaced contact segments to another whereby said contact wiper will be in contact with one of said segment at all times except during said stepping movement, said interconnecting means including means providing a plurality of stationary, inwardly facing ratchet teeth extending circumferentially around the axis of said indicator shaft, a link having a tooth engageable with said ratchet teeth, means mounting said link on said low order indicator shaft for rotation with said indicator shaft and for radial movement with respect to said indicator shaft whereby said tooth can become engaged with and disengaged from said ratchet teeth, camming means driven by said shaft member, a follower on said link cooperating with said camming means to effect an inward radial movement of said tooth when said shaft member is rotated, and a spring connected between said shaft member and said indicator shaft for storing energy to rotate said link and indicator shaft when said tooth becomes disengaged from a rachet tooth, said camming means and follower effecting a radial outward movement of said tooth as said indicator shaft rotates to cause said tooth to engage a next ratchet tooth.

3. In a meter having an element movable in response to the condition to be metered, the combination comprising a plurality of digital indicator shafts, one for each order of digits to be registered by the meter, a circuit means associated with each shaft for indicating the registering position thereof, each circuit means including a plurality of circumferentially spaced contact segments and a contact wiper rotatable with each shaft and movable across said segments for making different circuit connections in accordance with the shaft positions, means for transmitting movement of said condition responsive element to the low order digital indicator shaft, including a shaft member cooperable with said condition responsive element for movement in relation therewith, and means interconnecting said shaft member with said low order indicator shaft for moving the same successively through a stepping movement only after a predetermined amount of rotation of said shaft member, said stepping movement of said low order indicator shaft causing rotation of said contact wiper from one of said spaced contact segments to another whereby said contact wiper will be in contact with one of said segments at all times except during said stepping movement, said interconnecting means including means providing a plurality of stationary, inwardly facing ratchet teeth extending circumferentially around the axis of said indicator shaft, a link having a tooth engageable with said ratchet teeth, an elongated slot in said link, a walled portion on said indicator shaft, said slot fitting over said walled portion and permitting radial sliding of said link but prohibiting relative rotation between said link and said indicator shaft, a pin driven by said shaft member in a path such that the axis of the pin describes a circular cylinder, a second slot in said link inclined with respect to the length of said elongated slot, said pin extending through said second slot to effect inward radial movement of said link as said shaft member rotates, and a spring connected between said shaft member and said indicator shaft for storing energy to rotate said link and indicator shaft when said tooth becomes disengaged from a ratchet tooth as a result of inward radial movement of said tooth, said pin and second slot effecting a radial outward movement of said tooth as said indicator shaft rotates to cause said tooth to engage a next ratchet tooth.

4. In a meter having an element movable in response to the condition to be metered, the combination comprising a plurality of digital indicator shafts, one for each order of digits to be registered by the meter, a circuit means associated with each shaft for indicating the registering position thereof, each circuit means including a plurality of circumferentially spaced contact segments and a contact wiper rotatable with each shaft and movable across said segments for making different circuit connections in accordance with the shaft positions, means for transmitting movement of said condition responsive element to the low order digital indicator shaft, including a shaft member cooperable with said condition responsive element for movement in relation therewith, and means interconnecting said shaft member with said low order indicator shaft for moving the same successively through a stepping movement only after a predetermined amount of rotation of said shaft member, said stepping movement of said low order indicator shaft causing rotation of said contact wiper from one of said spaced contact segments to another whereby said contact wiper will be in contact with one of said segments at all times except during said stepping movement, said interconnecting means including means providing a plurality of stationary, inwardly facing ratchet teeth extending circumferentially around the axis of said indicator shaft, a link having a tooth engageable with said ratchet teeth, an elongated slot in said link, a walled portion on said indicator shaft, said slot fitting over said walled portion and permitting radial sliding of said link but prohibiting relative rotation between said link and said indicator shaft, camming means driven by said shaft member, a follower on said link cooperating with said camming means to effect an inward radial movement of said tooth when said shaft member is rotated, and a spring connected between said shaft member and said indicator shaft for storing energy to rotate said link and indicator shaft when said tooth becomes disengaged from a ratchet tooth, said camming means and follower effecting a radial outward movement of said tooth as said indicator shaft rotates to cause said tooth to engage a next ratchet tooth.

5. In a meter having an element movable in response to the condition to be metered, the combination comprising a plurality of digital indicator shafts, one for each order of digits to be registered by the meter, a circuit means associated with each shaft for indicating the registering position thereof, each circuit means including a plurality of circumferentially spaced contact segments and a contact wiper rotatable with each shaft and movable across said segments for making different circuit connections in accordance with the shaft position, means for transmitting movement of said condition responsive element to the low order digital indicator shaft, including a shaft member cooperable with said condition responsive element for movement in relation therewith, and means interconnecting said shaft member with said low order indicator shaft for moving the same successively through a stepping movement only after a predetermined amount of rotation of said shaft member, said stepping movement of said low order indicator shaft causing rotation of said contact wiper from one of said spaced contact segments to another whereby said contact wiper will be in contact with one of said segments at all times except during said stepping movement, said interconnecting means including cam means and follower means, said cam means being connected to be driven by said shaft member from an initial relationship with respect to said follower to a predetermined critical relationship, a spring connected to be deformed in response to movement of said cam means for storing energy imparted to it as a result of movement of said shaft member, means for releasing energy stored by said spring when said cam means and said follower reach said predetermined critical relationship, said means for releasing energy including means for delivering part of said stored energy to impart a step movement to said indicator shaft when said energy is released and for simultaneously delivering part of said stored energy to said follower to return said cam and follower to their initial relationship, said interconnecting means also including a plurality of stationary, inwardly facing ratchet teeth extending circumferentially around the axis of said indicator shaft and a stepping link having a tooth engageable with said ratchet teeth and mounted for movement along said ratchet teeth, and means connecting said stepping link with said low order indicator shaft, said stepping link being connected to said follower means and normally held in a position in which its tooth is in engagement with one of the ratchet teeth.

6. In a meter having an element movable in response to the condition to be metered, the combination comprising a plurality of digital indicator shafts, one for each order of digits to be registered by the meter, a circuit means associated with each shaft for indicating the registering position thereof, each circuit means including a plurality of circumferentially spaced contact segments and a contact wiper rotatable with each shaft and movable across said segments for making different circuit connections in accordance with the shaft positions, means for transmitting movement of said condition responsive element to the low order digital indicator shaft, including a shaft member cooperable with said condition responsive element for movement in relation therewith, and means interconnecting said shaft member with said low order indicator shaft for moving the same successively through a stepping movement only after a predetermined amount of rotation of said shaft member, said stepping movement of said low order indicator shaft causing rotation of said contact wiper from one of said spaced contact segments to another whereby said contact wiper will be in contact with one of said segments at all times except during said stepping movement, said interconnecting means including cam means and follower means, said cam means being connected to be driven by said shaft member from an initial relationship with respect to said follower to a predetermined critical relationship, a spring connected to be deformed in response to movement of said cam means for storing energy imparted to it as a result of movement of said shaft member, means for releasing energy stored by said spring when said cam means and said follower reach said predetermined critical relationship, said means for releasing energy including means for delivering part of said stored energy to impart a step movement to said indicator shaft when said energy is released and for simultaneously delivering part of said stored energy to said follower to return said cam and follower to their initial relationship, said interconnecting means also including a plurality of stationary, inwardly facing ratchet teeth extending circumferentially around the axis of said indicator shaft and a stepping link having a tooth engageable with said ratchet teeth and mounted for movement along said ratchet teeth, and means connecting said stepping link with said low order indicator shaft, said stepping link being connected to said follower means and normally held in a position in which its tooth is in engagement with one of the ratchet teeth, said cam means comprising a pin carried by said shaft member, and said follower comprising a slot in said stepping link through which said pin extends, said slot being arranged so that, when said shaft member rotates through a predetermined distance, said tooth of the stepping link disengages the ratchet teeth.

7. In a meter having an element movable in response to the condition to be metered, the combination comprising a plurality of digital indicator shafts, one for each order of digits to be registered by the meter, a circuit means associated with each shaft for indicating the registering position thereof, each circuit means including a plurality of circumferentially spaced contact segments and a contact wiper rotatable with each shaft and movable across said segments for making different circuit connections in accordance with the shaft positions, means for transmitting movement of said condition responsive element to the low order digital indicator shaft, including a shaft member cooperable with said condition responsive element for movement in relation therewith, and means interconnecting said shaft member with said low order indicator shaft for moving the same successively through a stepping movement only after a predetermined amount of rotation of said shaft member, said stepping movement of said low order indicator shaft causing rotation of said contact wiper from one of said spaced contact segments to another whereby said contact wiper will be in contact with one of said segments at all time except during said stepping movement, said interconnecting means including cam means and follower means, said cam means being connected to be driven by said shaft member from an initial relationship with respect to said follower to a predetermined critical relationship, a spring connected to be deformed in response to movement of said cam means for storing energy imparted to it as a result of movement of said shaft member, means for releasing energy stored by said spring when said cam means and said follower reach said predetermined critical relationship, said means for releasing energy including means for delivering part of said stored energy to impart a step movement to said indicator shaft when said energy is released and for simultaneously delivering part of said stored energy to said follower to return said cam and follower to their initial relationship, said interconnecting means also including a plurality of stationary, inwardly facing ratchet teeth extending circumferentially around the axis of said indicator shaft and a stepping link having a tooth engageable with said ratchet teeth and mounted for movement along said ratchet teeth, and means connecting said stepping link with said low order indicator shaft, including wall means on said indicator shaft in driving engagement with a slot in said stepping link.

References Cited

UNITED STATES PATENTS

| | | | |
|---|---|---|---|
| 2,762,884 | 9/1956 | Van Eyk | 74—1.5 X |
| 3,069,670 | 12/1962 | Rondeau et al. | 340—188 |
| 3,130,594 | 4/1964 | Campbell | 74—1.5 X |
| 3,195,814 | 7/1965 | Steinkamp | 74—1.5 X |

ALFRED E. SMITH, Primary Examiner

U.S. Cl. X.R.

74—1.5; 340—188